United States Patent
Park et al.

(10) Patent No.: US 8,658,306 B2
(45) Date of Patent: *Feb. 25, 2014

(54) ELECTRODE TERMINAL CONNECTING MEMBER FOR BATTERY MODULE

(75) Inventors: Youngsun Park, Daejeon (KR); Han Eun Kim, Seoul (KR); Yonghan Lee, Daejeon (KR); John E. Namgoong, Daejeon (KR); Sain Park, Anyang-si (KR); Masayuki Wakebe, Chungcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 616 days.

This patent is subject to a terminal disclaimer.

(21) Appl. No.: 12/920,644

(22) PCT Filed: Mar. 7, 2009

(86) PCT No.: PCT/KR2009/001142
§ 371 (c)(1),
(2), (4) Date: Jan. 5, 2011

(87) PCT Pub. No.: WO2009/110771
PCT Pub. Date: Sep. 11, 2009

(65) Prior Publication Data
US 2011/0091763 A1    Apr. 21, 2011

(30) Foreign Application Priority Data
Mar. 7, 2008  (KR) .................. 10-2008-0021213

(51) Int. Cl.
*H01M 2/24*    (2006.01)

(52) U.S. Cl.
USPC ............ 429/158; 429/156; 429/160; 429/162

(58) Field of Classification Search
None
See application file for complete search history.

(56) References Cited

U.S. PATENT DOCUMENTS

| | | | |
|---|---|---|---|
| 5,985,480 A * | 11/1999 | Sato et al. | ........................ 429/65 |
| 2005/0260491 A1 | 11/2005 | Cho | |
| 2005/0287427 A1 | 12/2005 | Kim et al. | |
| 2007/0178377 A1 | 8/2007 | Kim et al. | |

FOREIGN PATENT DOCUMENTS

| | | | | |
|---|---|---|---|---|
| JP | 2007-109548 | * | 4/2007 | ............. H01M 2/20 |
| JP | 2007-265945 | * | 10/2007 | ............. H01M 2/10 |

* cited by examiner

*Primary Examiner* — Ula C Ruddock
*Assistant Examiner* — Tony Chuo
(74) *Attorney, Agent, or Firm* — Birch, Stewart, Kolasch & Birch, LLP

(57) ABSTRACT

A conductive electrode terminal connecting member configured to electrically connect plate-shaped secondary battery cells ('battery cells') constituting a battery module to each other is provided. The electrode terminal connecting member includes a left-wing connection part to which electrode terminals of left-side battery cells are connected so as to achieve electrical connection in series or in series and in parallel between the battery cells, and a right-wing connection part to which electrode terminals of right-side battery cells are connected so as to achieve electrical connection in series or in series and in parallel between the battery cells. The left-wing connection part is provided with slits through which the electrode terminals of the respective battery cells are inserted, and the right-wing connection part is provided with slits through which the electrode terminals of the respective battery cells are inserted.

13 Claims, 4 Drawing Sheets

102

104

ELECTRODE TERMINAL CONNECTING MEMBER FOR BATTERY MODULE

TECHNICAL FIELD

The present invention relates to an electrode terminal connecting member of a battery module, and, more particularly, to a conductive electrode terminal connecting member configured to electrically connect plate-shaped secondary battery cells ('battery cells') constituting a battery module to each other, wherein the electrode terminal connecting member includes a left-wing connection part to which electrode terminals of left-side battery cells are connected so as to achieve electrical connection in series or in series and in parallel between the battery cells, and a right-wing connection part to which electrode terminals of right-side battery cells are connected so as to achieve electrical connection in series or in series and in parallel between the battery cells, the left-wing connection part is provided with slits through which the electrode terminals of the respective battery cells are inserted, and the right-wing connection part is provided with slits through which the electrode terminals of the respective battery cells are inserted, and, during electrical connection, the electrode terminals of the respective battery cells are inserted through the slits of the left- and right-wing connection parts, are bent such that the electrode terminals of the respective battery cells come into tight contact with the top of the electrode terminal connecting member, and then the electrode terminals of the respective battery cells are coupled to the electrode terminal connecting member by welding.

BACKGROUND ART

Recently, a secondary battery, which can be charged and discharged, has been widely used as an energy source for wireless mobile devices. Also, the secondary battery has attracted considerable attention as a power source for electric vehicles (EV) and hybrid electric vehicles (HEV), which have been developed to solve problems, such as air pollution, caused by existing gasoline and diesel vehicles using fossil fuel.

As a result, kinds of applications using the secondary battery are being increased owing to advantages of the secondary battery, and hereafter the secondary battery is expected to be applied to more applications and products than now.

Small-sized mobile devices use one or several battery cells for each device. On the other hand, middle- or large-sized devices, such as vehicles, use a middle- or large-sized battery module having a plurality of battery cells electrically connected with one another because high power and large capacity are necessary for the middle- or large-sized devices.

The size and weight of the battery module is directly related to the receiving space and power of the corresponding middle- or large-sized device. For this reason, manufacturers are trying to manufacture small-sized, light-weight battery modules. Furthermore, devices, which are subject to a large number of external impacts and vibrations, such as electric bicycles and electric vehicles, require stable electrical connection and physical coupling between components constituting the battery module. In addition, a plurality of battery cells are used to accomplish high power and large capacity, and therefore, the safety of the battery module is regarded as important.

Preferably, the middle- or large-sized battery module is manufactured so as to have as small a size and weight as possible. For this reason, a prismatic battery or a pouch-shaped battery, which can be stacked with high integration and has a small weight to capacity ratio, is usually used as a battery cell of the middle- or large-sized battery module. Especially, much interest is currently focused on the pouch-shaped battery, which uses an aluminum laminate sheet as a sheathing member, because the weight of the pouch-shaped battery is small, and the manufacturing costs of the pouch-shaped battery are low.

In spite of the above-mentioned advantages, however, the pouch-shaped battery, used as a unit cell of the battery module, has several problems as follows.

First, the pouch-shaped battery is configured in a structure in which plate-shaped electrode terminals of the pouch-shaped battery protrude from the upper end of the pouch-shaped battery, with the result that the electrical connection between the electrode terminals necessary for constituting a battery module is difficult. The electrical connection between the electrode terminals is accomplished generally by coupling the electrode terminals to each other by welding using wires, plates, or bus bars; however, the coupling between the plate-shaped electrode terminals by welding is not easy. Generally, the plate-shaped electrode terminals are partially bent, and the plates or the bus bars are welded to the bent portions of the plate-shaped electrode terminals, which requires skilled technique and complicates a process for electrically connecting the electrode terminals to each other. Furthermore, the coupled region may be separated from each other due to external impact, which causes the defect of the pouch-shaped battery.

Secondly, the pouch-shaped battery has a low mechanical strength. For this reason, a plurality of additional members for maintaining stable coupling and assembly is required when a plurality of batteries are stacked to manufacture a battery module. For example, additional mounting members, such as cartridges, in each of which one or more unit batteries are mounted, are used when the pouch-shaped batteries are stacked to manufacture the battery module. The cartridges are stacked to manufacture the battery module.

Also, when a plurality of battery cells are used to constitute a battery module, a large number of members are needed generally to accomplish the mechanical coupling and electrical connection between the battery cells, and a process for assembling the members is very complicated. Furthermore, a space necessary to couple, weld, or solder the members for the mechanical coupling and electrical connection is required, with the result that the total size of the system is increased.

In addition, when the number of battery cells constituting a battery module is changed for small quantity batch production, it is necessary to change the number or shape of electrode terminal connecting members for electrically connecting electrode terminals of the battery cells to each other accordingly.

Therefore, there is a high necessity for an electrode terminal connecting member to electrically connect a plurality of battery cells constituting a battery module to one another, i.e., an electrode terminal connecting member to electrically connect the battery cells to one another in series and/or in parallel.

DISCLOSURE

Technical Problem

Therefore, the present invention has been made to solve the above problems, and other technical problems that have yet to be resolved.

Specifically, it is an object of the present invention to provide an electrode terminal connecting member of a battery module that is capable of achieving easy electrical connection or mechanical coupling between battery cells constituting the battery module, thereby improving productivity and safety.

It is another object of the present invention to provide an electrode terminal connecting member having a structure that is capable of easily corresponding to change in number of battery cells constituting a battery module for small quantity batch production.

Technical Solution

In accordance with one aspect of the present invention, the above and other objects can be accomplished by the provision of a conductive electrode terminal connecting member configured to electrically connect plate-shaped secondary battery cells ('battery cells') constituting a battery module to each other, wherein the battery module has a structure in which two or more battery cells are arranged in a lateral direction thereof, the electrode terminal connecting member includes a plate-shaped member body configured to be disposed on electrode terminals of the battery cells which are arranged in the lateral direction thereof, the plate-shaped member body having a predetermine thickness, a left-wing connection part extending from the plate-shaped member body such that the electrode terminals of the left-side battery cells are connected to the left-wing connection part to achieve electrical connection in series or in series and in parallel between the battery cells, and a right-wing connection part extending from the plate-shaped member body such that the electrode terminals of the right-side battery cells are connected to the right-wing connection part to achieve electrical connection in series or in series and in parallel between the battery cells, the left-wing connection part is provided with slits, corresponding to shapes of the electrode terminals of the battery cells, through which the plate-shaped electrode terminals of the respective battery cells ('battery cell electrode terminals') are inserted, and the right-wing connection part is provided with slits, corresponding to shapes of the battery cell electrode terminals, through which the battery cell electrode terminals are inserted, and, during electrical connection, the battery cell electrode terminals are inserted through the slits of the left- and right-wing connection parts, are bent such that the battery cell electrode terminals come into tight contact with a top of the electrode terminal connecting member, and then the battery cell electrode terminals are coupled to the electrode terminal connecting member by welding.

In a battery module including two or more battery cells arranged in the lateral direction thereof, therefore, the left-wing connection part is connected to cathode terminals or anode terminals ('left-side electrode terminals) located at the left side of the battery cells, and the right-wing connection part is connected to cathode terminals or anode terminals ('right-side electrode terminals) located at the right side of the battery cells. As a result, the battery cells arranged in the lateral direction thereof are electrically connected in series to one another in regular sequence.

Also, the left-wing connection part and the right-wing connection part have the slits through which the electrode terminals of the respective battery cells are inserted. Consequently, the battery cell electrode terminals are inserted through the respective slits, are bent, and are then connected to the electrode terminal connecting member by welding, thereby achieving electrical connection between the electrode terminals of the battery cells. Also, the electrode terminals of the battery cells, disposed adjacent to the electrode terminal connecting member in a tight contact manner, are effectively connected to one another, and the assembly process is easily carried out. In addition, the electrode terminal connecting member serves as a kind of coupling member to interconnect the battery cells, thereby providing high structural stability and high coupling strength at coupling regions between the battery cells.

Furthermore, the number of the slits may be changed depending upon the number of the battery cells constituting the battery module. When the number of the battery cells is changed as previously described, therefore, it is possible to easily change the number of the slits so as to easily correspond to the change in number of the battery cells.

The plate-shaped battery cells may be secondary batteries each having a small thickness, a relatively large width, and a relatively large length enough to minimize the total size of the secondary batteries when secondary batteries are stacked in the lateral direction so as to constitute a battery module. In a preferred example, each of the battery cells may be configured such that an electrode assembly is mounted in a battery case formed of a laminate sheet including a metal layer and a resin layer in a sealed state. More specifically, each of the battery cells may be configured such that an electrode assembly is mounted in a pouch-shaped case formed of an aluminum laminate sheet, and a pair of electrode terminals protrudes from one end of the case. The secondary battery having the above structure may also be referred to as a pouch-shaped battery cell.

Generally, each of the plate-shaped battery cells is configured in a structure in which an electrode assembly is mounted in a cell case, and electrode terminals electrically connected to a cathode and an anode of the electrode assembly protrude outward from the case. Consequently, each of the battery cell electrode terminals may be formed of a metal plate in consideration of conductivity, durability, and weldability with respect to another component.

As previously described, the left-wing connection part of the electrode terminal connecting member electrically connects the left-side electrode terminals of the battery cells arranged in the lateral direction thereof, which are located at the left side of the plate-shaped member body, to one another, and the right-wing connection part of the electrode terminal connecting member electrically connects the right-side electrode terminals of the battery cells arranged in the lateral direction thereof, which are located at the right side of the plate-shaped member body, to one another. Only one battery cell may be connected to each of the connection parts, or two or more battery cells may be connected to each of the connection parts. For example, when the number of the left-side electrode terminals connected to the left-wing connection part is two or more and when the number of the right-side electrode terminals connected to the right-wing connection part is two or more, parallel connection between the battery cells corresponding to the number of the battery cells connected to connection parts may be possible in addition to series connection between the battery cells.

In a preferred example of the structure in which the battery cells are connected in series and in parallel to one another, the left-wing connection part may be provided with a step formed in the lateral direction such that the step corresponds to the number of the battery cells connected in series to one another, and the right-wing connection part may be provided with a step formed in the lateral direction such that the step corresponds to the number of the battery cells connected in series to one another.

For example, the left-wing connection part may extend in the left upper direction of the plate-shaped member body, and the right-wing connection part may extend in the right lower direction of the plate-shaped member body. Consequently, the left-wing connection part is connected to the left electrode terminals of the battery cells, which are located at the left side of the plate-shaped member body, and the right-wing connection part is connected to the right electrode terminals of the battery cells, which are located at the right side of the plate-shaped member body, while the right-wing connection part has a step formed in the lateral direction such that the step corresponds to the number of the battery cells connected in series to the left-side connection part. As a result, the battery cells connected to the left-wing connection part and the battery cells connected to the right-wing connection part are connected in series to each other. Also, the battery cells of each connection part are connected in parallel to each other.

In this case, the left-wing connection part may be provided with two or more slits arranged in the lateral direction thereof such that two or more adjacent battery cells are connected in parallel to each other, and the right-wing connection part may be provided with two or more slits arranged in the lateral direction thereof such that two or more adjacent battery cells are connected in parallel to each other. For example, when the battery cells are electrically connected to each other in a 3P (parallel)-2S (series) connection structure, the left-wing connection part may have three slits, and the right-wing connection part may have three slits. On the other hand, when the battery cells are electrically connected to each other in a 2P-2S connection structure, the left-wing connection part may have two slits, and the right-wing connection part may have two slits.

The slits are not particularly restricted as long as the battery cell electrode terminals can be easily inserted through the slits of the left- and right-wing connection parts. For example, the slits may be depressed from the outside end of each of the left- and right-wing connection parts. Alternatively, the slits may be formed in each of the left- and right-wing connection parts such that the slits are spaced apart from the outside end of each of the left- and right-wing connection parts by a predetermined distance.

Meanwhile, as previously described, the coupling between the electrode terminals of the battery cells and the electrode terminal connecting member may be achieved by inserting the electrode terminals of the respective battery cells through the slits of the left- and right-wing connection parts, bending the electrode terminals of the respective battery cells such that the electrode terminals of the respective battery cells comes into tight contact with the top of the electrode terminal connecting member, and welding the bent portions of the electrode terminals of the respective battery cells to the top of the electrode terminal connecting member in a state in which the electrode terminals of the respective battery cells are in tight contact with the top of the electrode terminal connecting member, thereby achieving stable mechanical coupling and electrical connection. The welding may be appropriately carried out using a welding method selected from a group consisting of resistance welding, laser welding, arc welding, and ultrasonic welding.

As previously described, the electrode terminals of the battery cells may be electrically connected to or mechanically coupled to the top of the electrode terminal connecting member through only welding between the electrode terminals of the battery cells and the electrode terminal connecting member. In this case, however, the welded region may be separated due to external impact applied to the battery module or expansion or twist of the battery module, with the result that the electrode terminal connecting member may be dislocated, and therefore, a short circuit of the battery module may occur. In order to prevent the occurrence of the short circuit, therefore, it is preferable to configure the electrode terminal connecting member such that the electrode terminal connecting member has a more stable coupling structure. For example, the plate-shaped member body may be provided at the top and/or bottom thereof with a coupling structure to interconnect electrode terminal connecting members.

In a preferred example of the coupling structure, a frame configured in a hollow structure ('hollow frame') may be formed at the top and/or bottom of the plate-shaped member body in the lateral direction of the battery cells, and a bar type insulating joint member may be fixedly inserted through the hollow frame in a state in which a plurality of electrode terminal connecting members are arranged in the lateral direction thereof.

In the coupling structure in which the electrode terminal connecting members are fixed using the hollow frame and the insulating joint member, therefore, it is possible to prevent electrical contact between the electrode terminal connecting members and the insulating joint member and, in addition, to effectively prevent dislocation of the electrode terminal connecting members when external impact is applied to the battery module.

Also, the hollow frame may be formed at the top or bottom of the plate-shaped member body. Alternatively, the hollow frame may be formed at both the top and bottom of the plate-shaped member body. That is, the hollow frame may be selectively used as needed.

In the above coupling structure, the insulating joint member is not particularly restricted as long as the insulating joint member can be made of a material to secure desired rigidity and insulation or can be configured in a structure to secure desired rigidity and insulation. For example, the insulating joint member may be made of an insulative material or may be configured in a structure in which a metal rod is covered with an insulative material.

Preferably, the insulating joint member includes a rod made of a metal material exhibiting high physical rigidity and an insulative material covering the rod. For example, an insulative film having a predetermined thickness may be attached to the outside of the rod so as to isolate the rod from the hollow frame. Alternatively, the rod may be covered with an insulative coating layer.

Meanwhile, the insulative film or the insulative coating layer may be made of, for example, resin or rubber.

In accordance with another aspect of the present invention, there is provided a middle- or large-sized battery module having a structure in which two or more battery cells are arranged in a lateral direction thereof, wherein the battery cells are electrically connected to each other via the electrode terminal connecting members.

One or more electrode terminal connecting members may be used based on the number of the battery cells arranged in the lateral direction thereof or the arrangement structure of the battery cells arranged in the lateral direction thereof. In a case in which two or more electrode terminal connecting members are used, an insulating member is preferably disposed between the respective electrode terminal connecting members so as to prevent electrical contact between the respective electrode terminal connecting members.

According to circumstances, the middle- or large-sized battery module may further have a structure in which two or more battery cells are arranged in the longitudinal direction thereof in addition to a lateral arrangement structure. Consequently, the electrode terminal connecting member is preferably used not only to achieve electrical connection between the battery cells arranges in the lateral direction thereof and but also to achieve electrical connection between the battery cells arranges in the longitudinal direction thereof.

In particular, the middle- or large-sized battery module according to the present invention is preferably used in a middle- or large-sized battery module or a middle- or large-sized battery pack having high power and large capacity, which requires a long-term life span and excellent durability. The middle- or large-sized battery module may be used as a power source for, for example, electric vehicles, hybrid electric vehicles, electric motorcycles, and electric bicycles.

The structures of the middle- or large-sized battery module and the middle- or large-sized battery pack and a method of manufacturing the same are well known in the art to which the present invention pertains, and a detailed description thereof will not be given.

BRIEF DESCRIPTION OF THE DRAWINGS

The above and other objects, features and other advantages of the present invention will be more clearly understood from the following detailed description taken in conjunction with the accompanying drawings, in which.

BEST MODE

Now, exemplary embodiments of the present invention will be described in detail with reference to the accompanying drawings. It should be noted, however, that the scope of the present invention is not limited by the illustrated embodiments.

Figure 1:
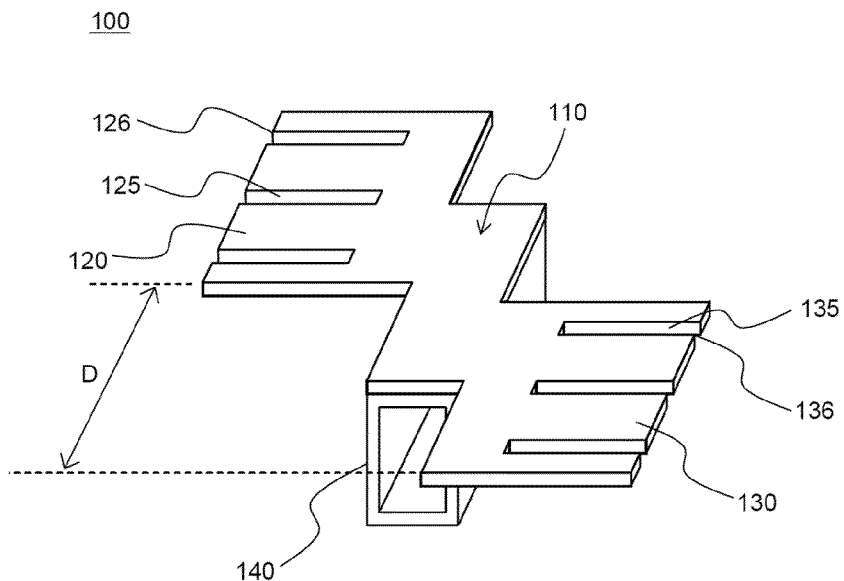
FIG. 1 is a perspective view illustrating an electrode terminal connecting member according to an embodiment of the present invention.
Figure 2:
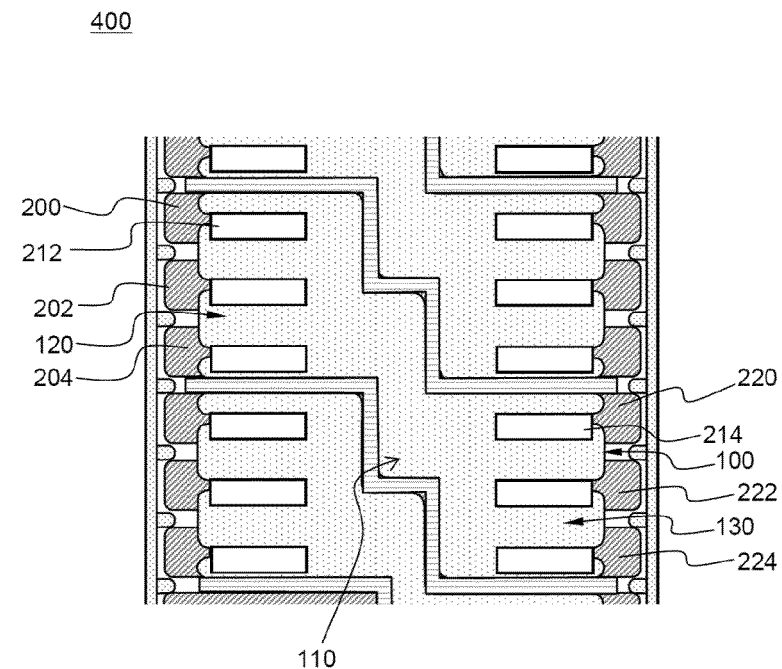
FIG. 2 is a partial typical view illustrating a structure in which the electrode terminal connecting member is coupled to a battery module.

FIG. 1 is a perspective view typically illustrating an electrode terminal connecting member according to an embodiment of the present invention, and FIG. 2 is a partial typical view illustrating a structure in which the electrode terminal connecting member is coupled to a battery module.

Referring to these drawings, an electrode terminal connecting member 100 includes a plate-shaped member body 110 configured to be disposed on left-side electrode terminals 212 of battery cells 200, 202, and 204 and right-side electrode terminals 214 of battery cells 220, 222, and 224, a left-wing connection part 120 and a right-wing connection part 130 formed at the left and right of the plate-shaped member body 110, and a hollow frame 140 fixed to the bottom of the plate-shaped member body 110.

The left-wing connection part 120 extends from the plate-shaped member body 110 in the left upper direction, and the right-wing connection part 130 extends from the plate-shaped member body 110 in the right lower direction. The left-wing connection part 120 is provided a step D corresponding to the sum of the sizes of the three battery cells 200, 202, and 204, which are connected in series to one another, in the lateral direction thereof. Also, the right-wing connection part 130 is provided a step D corresponding to the sum of the sizes of the three battery cells 220, 222, and 224, which are connected in series to one another, in the lateral direction thereof.

Also, three slits 125 are depressed from the outside end 126 of the left-wing connection part 120, and three slits 135 are depressed from the outside end 136 of the right-wing connection part 130.

During assembly of a battery module 400, electrode terminals 212 and 214 of the battery cells 200 and 220 are inserted through the slits 125 and 135 of the electrode terminal connecting member 100, are bent such that the electrode terminals 212 and 214 of the battery cells 200 and 220 come into tight contact with the top of the electrode terminal connecting member 100, and are then coupled to the top of the electrode terminal connecting member 100 by resistance welding or the like.

The left-wing connection part 120 is connected to the cathode terminals 212 of the battery cells 200, 202, and 204 located at the left upper part of the plate-shaped member body 110, and right-wing connection part 130 is connected to the anode terminals 214 of the battery cells 220, 222, and 224 located at the right lower part of the plate-shaped member body 110. As a result, the left-side battery cells 200, 202, and 204 and the right-side battery cells 220, 222, and 224 are electrically connected in series and in parallel to one another in a 3S-2P connection structure.

Figure 3:
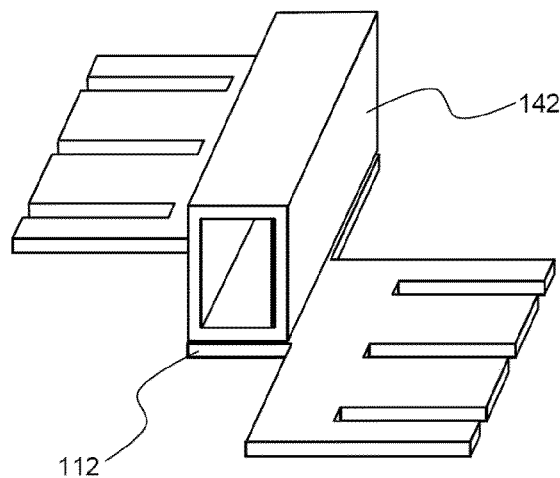
FIGS. 3 and 4 are perspective views respectively illustrating electrode terminal connecting members according to other embodiments of the present invention.
Figure 4:
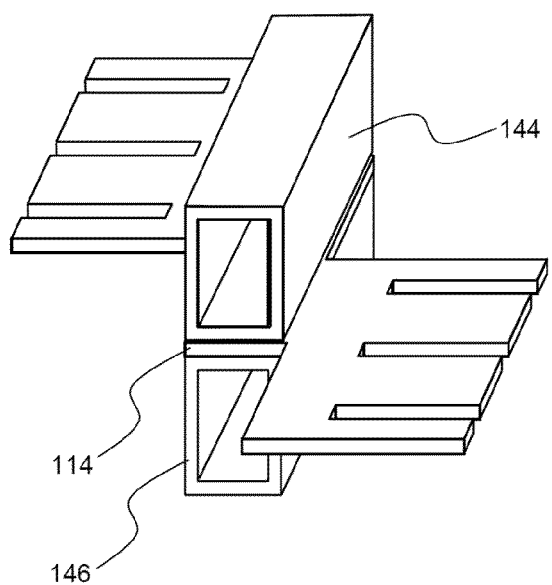

FIGS. 3 and 4 are perspective views respectively illustrating electrode terminal connecting members according to other embodiments of the present invention.

Referring to these drawings, an electrode terminal connecting member 102 of FIG. 3 is configured in a structure in which a hollow frame 142 is fixed to the top of a plate-shaped member body 112, and an electrode terminal connecting member 104 of FIG. 4 is configured in a structure in which a hollow frame 144 is fixed to the top of a plate-shaped member body 114, and another hollow frame 146 is fixed to the bottom of the plate-shaped member body 114. The electrode terminal connecting members 102 and 104 having the above-described structures may be selectively used based on an electrical connection structure of battery cells.

Figure 5:
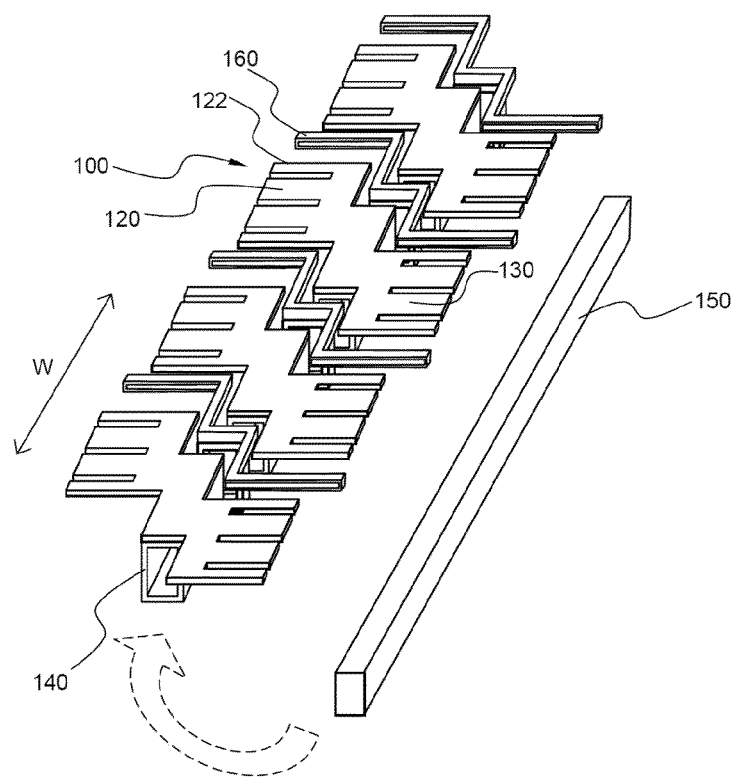
FIG. 5 is a typical view illustrating a process for connecting a plurality of electrode terminal connecting members to one another using an insulating joint member and insulating members.
Figure 6:
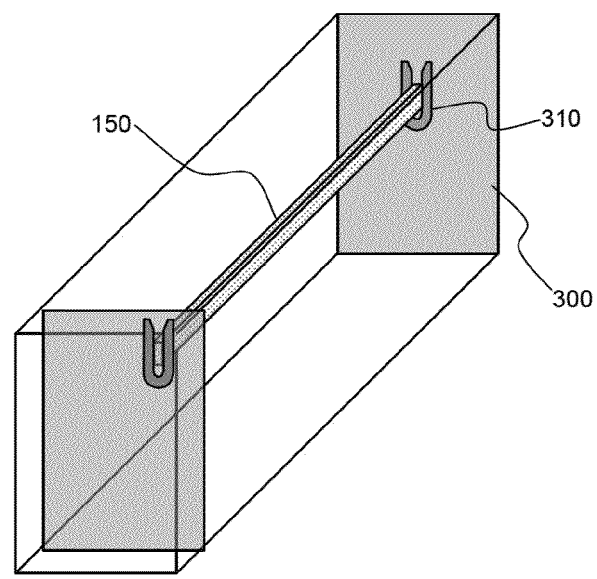
FIG. 6 is a typical view illustrating a structure in which the insulating joint member is mounted in a battery module.
Figure 7:
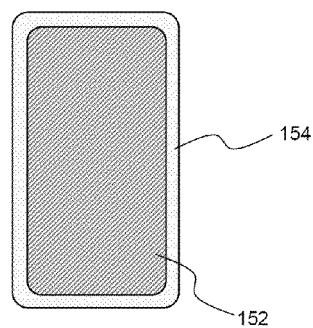
FIG. 7 is a typical view illustrating the vertical section of the insulating joint member.

FIG. 5 is a typical view illustrating a process for connecting a plurality of electrode terminal connecting members to one another using an insulating joint member and insulating members, FIG. 6 is a typical view illustrating a structure in which the insulating joint member is mounted in a battery module, and FIG. 7 is a typical view illustrating the vertical section of the insulating joint member.

Referring to these drawings, a plurality of electrode terminal connecting members 100 is arranged in the lateral direction W thereof, a bar type insulating joint member 150 is inserted through the hollow frames 140 of the respective electrode terminal connecting members 100, and the insulating joint member 150 is mounted in a coupling part 310 formed in a battery module case 300 as shown in FIG. 6.

More specifically, the electrode terminals of the battery cells are inserted through the slits of the respective electrode terminal connecting members 100 and are then bent such that the electrode terminals of the battery cells are put in place. The bent portions of the electrode terminals are coupled to the tops of the respective electrode terminal connecting members 100 by resistance welding. The insulating joint member 150 is inserted through the hollow frames 140 of the respective electrode terminal connecting members 100, and the insulating joint member 150 is mounted in the coupling part 310 of the battery module case 300. Alternatively, this process may be carried out in reverse order.

As shown in FIG. 7, the insulating joint member 150 is configured in a structure in which a rod 152 made of a metal material is coated with an insulative resin 154 having a predetermined thickness. When the insulating joint member 150 is inserted through the hollow frame 140 so as to fix the electrode terminal connecting members 100, therefore, electric conduction between the respective electrode terminal connecting members 100 via the insulating joint member 150 does not occur. Also, insulating members 160 are disposed between the respective electrode terminal connecting members 100, with the result that electric conduction between the respective electrode terminal connecting members 100 is prevented. Hereinafter, the insulating members 160 will be described in detail with reference to FIG. 8.

Figure 8:
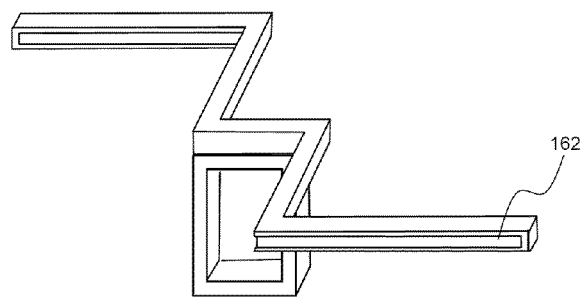
FIG. 8 is an enlarged typical view illustrating one of the insulating members of FIG. 5.

FIG. 8 is an enlarged typical view illustrating one of the insulating members of FIG. 5.

Referring to FIG. 8 together with FIG. 5, the insulating member 160 is bent in a shape corresponding to the outer circumference 122 of the electrode terminal connecting member 100. Also, the insulating member 160 is provided with fixing depression grooves 162 in which the outer circumferences of the left-wing connection part 120 and the right-wing connection part 130 are fitted in a tight contact manner, respectively. Consequently, the outer circumferences of the left-wing connection part 120 and the right-wing connection part 130 are inserted into the respective fixing depression grooves 162 of the insulating member 160, thereby achieving coupling between the insulating member 160 and the electrode terminal connecting member 100. Also, the insulating member 160 is interposed between the respective electrode terminal connecting members 100, and therefore, dislocation of the insulating member 160 is prevented.

Figure 9:
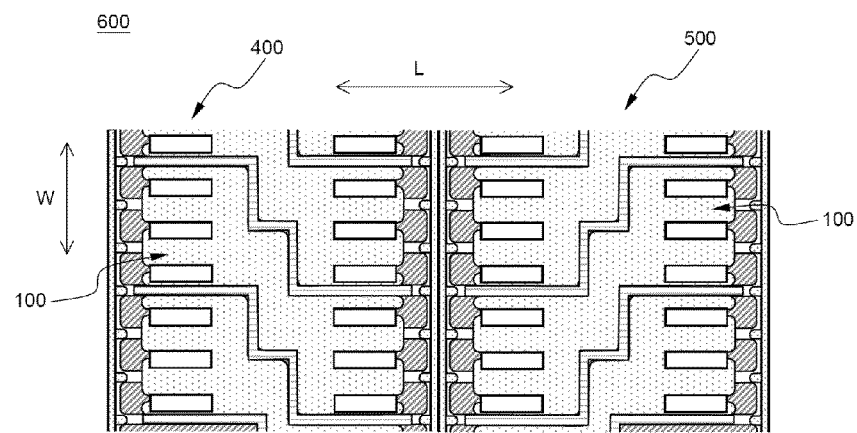
FIG. 9 is a partial typical view illustrating a middle- or large-sized battery module configured in a structure in which battery cells are arranged in the lateral direction and in the longitudinal direction thereof.

FIG. 9 is a partial typical view illustrating a middle- or large-sized battery module configured in a structure in which battery cells are arranged in the lateral direction and in the longitudinal direction thereof.

Referring to FIG. 9, a middle- or large-sized battery module 600 is configured in a structure in which two battery modules 400, one of which is shown in FIG. 2, are connected to each other in the longitudinal direction of the battery modules 400. Battery cells constituting each of the battery modules 400 are arranged in the lateral direction and in the longitudinal direction thereof. In each of the battery modules, i.e., the battery module 400 and the battery module 500, the battery cells arranged in the lateral direction W of each of the battery modules are connected in series and in parallel to one another via the respective electrode terminal connecting members 100, and the battery cells arranged in the longitudinal direction L of each of the battery modules are connected in series to one another via additional connecting members (not shown). That is, the battery modules 400 and 500 are connected in series to each other via the additional connecting members.

INDUSTRIAL APPLICABILITY

As is apparent from the above description, the electrode terminals of the battery cells are inserted through the slits of the electrode terminal connecting member, are bent, and then are welded to the electrode terminal connecting member, thereby achieving electrical connection between the electrode terminals of the battery cells. Also, the electrode terminals of the battery cells, disposed adjacent to the electrode terminal connecting member in a tight contact manner, are effectively connected to one another, and the assembly process is easily carried out. In addition, the electrode terminal connecting member serves as a kind of coupling member to interconnect the battery cells, thereby providing high structural stability and high coupling strength at coupling regions between the battery cells.

Also, when the number of battery cells is changed for small quantity batch production, it is possible to easily modify a connection structure according to the change in number of the battery cells. In addition, it is possible to reduce the number of components and the number of process steps, thereby reducing manufacturing costs and this greatly improving productivity.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A conductive electrode terminal connecting member configured to electrically connect plate-shaped secondary battery cells ('battery cells') constituting a battery module to each other, wherein the battery module has a structure in which two or more battery cells are arranged in a lateral direction thereof, the electrode terminal connecting member comprises a plate-shaped member body configured to be disposed on electrode terminals of the battery cells which are arranged in the lateral direction thereof, the plate-shaped member body having a predetermine thickness, a left-wing connection part extending from the plate-shaped member body such that the electrode terminals of the left-side battery cells are connected to the left-wing connection part to achieve electrical connection in series or in series and in parallel between the battery cells, and a right-wing connection part extending from the plate-shaped member body such that the electrode terminals of the right-side battery cells are connected to the right-wing connection part to achieve electrical connection in series or in series and in parallel between the battery cells, the left-wing connection part is provided with slits, corresponding to shapes of the electrode terminals of the battery cells, through which the plate-shaped electrode terminals of the respective battery cells ('battery cell electrode terminals') are inserted, and the right-wing connection part is provided with slits, corresponding to shapes of the battery cell electrode terminals, through which the battery cell electrode terminals are inserted, and during electrical connection, the battery cell electrode terminals are inserted through the slits of the left- and right-wing connection parts, are bent such that the battery cell electrode terminals come into tight contact with a top of the electrode terminal connecting member, and then the battery cell electrode terminals are coupled to the electrode terminal connecting member by welding, wherein the left-wing connection part is provided with a step formed in the lateral direction such that the step corresponds to the number of the battery cells connected in series to one another, and the right-wing connection part is provided with a step formed in the lateral direction such that the step corresponds to the number of the battery cells connected in series to one another, and wherein the left-wing connection part is provided with two or more slits arranged in the lateral direction thereof such that two of more adjacent battery cells are connected in parallel to each other, and the right-wing connection part is provided with two or more slits arranged in the lateral direction thereof such that two or more adjacent battery cells are connected in parallel to each other.

2. The electrode terminal connecting member according to claim 1, wherein each of the battery cells is configured such that an electrode assembly is mounted in a battery case formed of a laminate sheet comprising a metal layer and a resin layer in a sealed state.

3. The electrode terminal connecting member according to claim 1, wherein each of the battery cell electrode terminals is formed of a metal plate.

4. The electrode terminal connecting member according to claim 1, wherein the slits are depressed from an outside end of each of the left- and right-wing connection parts.

5. The electrode terminal connecting member according to claim 1, wherein the welding is carried out using a welding method selected from a group consisting of resistance welding, laser welding, arc welding, and ultrasonic welding.

6. The electrode terminal connecting member according to claim 1, wherein the plate-shaped member body is provided at a top and/or bottom thereof with a coupling structure to interconnect another electrode terminal connecting member.

7. The electrode terminal connecting member according to claim 6, wherein the coupling structure comprises a frame configured in a hollow structure ('hollow frame') formed in the lateral direction of the battery cells, and a bar type insulating joint member is fixedly inserted through the hollow frame in a state in which a plurality of electrode terminal connecting members are arranged in the lateral direction thereof.

8. The electrode terminal connecting member according to claim 7, wherein the insulating joint member comprises a rod made of a metal material and an insulative film attached to an outside of the rod.

9. The electrode terminal connecting member according to claim 7, wherein the insulating joint member comprises a rod made of a metal material and an insulative coating layer covering an outside of the rod.

10. A middle- or large-sized battery module having at least one electrode terminal connecting member according to claim 1 and a structure in which two or more battery cells are arranged in a lateral direction thereof, wherein the battery cells are electrically connected to each other via electrode terminal connecting members.

11. The middle- or large-sized battery module according to claim 10, wherein the battery module has at least two electrode terminal connecting members, and an insulating member is disposed between the respective electrode terminal connecting members.

12. The middle- or large-sized battery module according to claim 10, wherein the middle- or large-sized battery module further has a structure in which two or more battery cells are arranged in a longitudinal direction thereof.

13. A conductive electrode terminal connecting member configured to electrically connect plate-shaped secondary battery cells ('battery cells') constituting a battery module to each other, wherein
the battery module has a structure in which two or more battery cells are arranged in a lateral direction thereof,
the electrode terminal connecting member comprises a plate-shaped member body configured to be disposed on electrode terminals of the battery cells which are arranged in the lateral direction thereof, the plate-shaped member body having a predetermine thickness, a left-wing connection part extending from the plate-shaped member body such that the electrode terminals of the left-side battery cells are connected to the left-wing connection part to achieve electrical connection in series or in series and in parallel between the battery cells, and a right-wing connection part extending from the plate-shaped member body such that the electrode terminals of the right-side battery cells are connected to the right-wing connection part to achieve electrical connection in series or in series and in parallel between the battery cells,
the left-wing connection part is provided with slits, corresponding to shapes of the electrode terminals of the battery cells, through which the plate-shaped electrode terminals of the respective battery cells ('battery cell electrode terminals') are inserted, and the right-wing connection part is provided with slits, corresponding to shapes of the battery cell electrode terminals, through which the battery cell electrode terminals are inserted, and
during electrical connection, the battery cell electrode terminals are inserted though the slits of the left- and right-wing connection part, are bent such that the battery cell electrode terminals come into tight contact with a top of the electrode terminal connecting member, and then the battery cell electrode terminals are coupled to the electrode terminal connection member by welding,
wherein the left-wing connection part is provided with two or more slits arranged in the lateral direction thereof such that two of more adjacent battery cells are connected in parallel to each other, and the right-wing connection part is provided with two or more slits arranged in the lateral direction thereof such that two or more adjacent battery cells are connected in parallel to each other,
wherein the plate-shaped member body is provided at a top and/or bottom thereof with a coupling structure to interconnect another electrode terminal connection member, and
wherein the coupling structure comprises a frame configured in a hollow structure ('hollow frame') formed in the lateral direction of the battery cells, and a bar type insulating joint member is fixedly inserted through the hollow frame in a state in which a plurality of electrode terminal connecting members are arranged in the lateral direction thereof.

* * * * *